United States Patent
Amendolagine et al.

(10) Patent No.: US 7,053,956 B2
(45) Date of Patent: May 30, 2006

(54) METHOD OF AND APPARATUS FOR MAINTAINING SMOOTH VIDEO TRANSITION BETWEEN DISTINCT APPLICATIONS

(75) Inventors: James Amendolagine, San Jose, CA (US); Ted Dunn, Los Gatos, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 580 days.

(21) Appl. No.: 10/402,479

(22) Filed: Mar. 27, 2003

(65) Prior Publication Data
US 2004/0189872 A1 Sep. 30, 2004

(51) Int. Cl.
*H04N 5/445* (2006.01)

(52) U.S. Cl. .................. 348/565; 348/589; 725/37

(58) Field of Classification Search ............. 348/578, 348/589, 594, 595, 600, 565, 566, 706, 584, 348/586, 552; 345/634, 636, 640; 725/37, 725/59, 151, 152, 153, 139–142
See application file for complete search history.

(56) References Cited

U.S. PATENT DOCUMENTS

| | | | | |
|---|---|---|---|---|
| 5,432,561 A | * | 7/1995 | Strubbe | 348/565 |
| 6,046,777 A | * | 4/2000 | Patton et al. | 348/565 |
| 6,337,717 B1 | * | 1/2002 | Nason et al. | 348/567 |
| 6,388,700 B1 | * | 5/2002 | Beyers et al. | 348/571 |

OTHER PUBLICATIONS

"Xv-X Window System video extension", Xv(3X) manual page http://www.xfree86.org/4.2.1/Xv.3.html, 2 pages.

* cited by examiner

Primary Examiner—Michael H. Lee
(74) Attorney, Agent, or Firm—Haverstock & Owens LLP

(57) ABSTRACT

Embodiments of the present invention provide a method and apparatus for maintaining smooth video transition between distinct applications. Preferably, the apparatus implementing the present invention includes a processor, a secondary memory and a system memory. In providing a smooth transition between two applications, the apparatus and method provides synchronization of the video and graphics components while transitioning from a first application to a second application. If there is no video component in either application, no action is needed to provide a smooth transition between applications, and when only the first application includes a video component, the video component need only be turned off for smooth transition between the applications to occur. When both the first application and the second application include video components, smooth transition between the applications according to the present invention is dependent upon the display window size of the first application in comparison to the second application. The apparatus and method of the present invention triggers a process according to the size of the display windows of the first and second applications.

46 Claims, 4 Drawing Sheets

METHOD OF AND APPARATUS FOR MAINTAINING SMOOTH VIDEO TRANSITION BETWEEN DISTINCT APPLICATIONS

FIELD OF THE INVENTION

The present invention relates to the field of application systems. More particularly, the present invention relates to the field of the transition between distinct applications within a set-top box.

BACKGROUND OF THE INVENTION

In many hardware devices, a user can access applications that include a graphics component and a video component, and can transition to other applications having both components rather quickly. Such devices typically include a number of applications which are stored in a secondary storage within the device. In current hardware devices, the graphics component and the video component are not synchronized between applications. When the graphics component and the video component are not synchronized, the "tear-down" and "bring-up" of the applications being transitioned between become problematic. The transition may cause unsynchronized mixed graphics and video to have artifacts. For example, chroma color may be displayed when the video component is turned off prematurely. Such artifacts do not provide for a smooth transition between applications. In particular, television set-top boxes and related interactive televisions include such problems when the transition between applications occurs.

Set-top boxes are often used as intermediary devices between a content source, such as a personal computer or a remote cable televison provider, and a display device, such as a television. Often, set-top boxes include multiple applications including content menus and display parameter settings.

SUMMARY OF THE INVENTION

Embodiments of the present invention provide a method and apparatus for maintaining smooth video transition between distinct applications. Preferably, the apparatus implementing the present invention includes a processor, a secondary memory and a system memory. In providing a smooth transition between two applications, the apparatus and method provides synchronization of the video and graphics components while transitioning from a first application to a second application. If there is no video component in either application, no action is needed to provide a smooth transition between applications, and when only the first application includes a video component, the video component need only be turned off for smooth transition between the applications to occur. When both the first application and the second application include video components, smooth transition between the applications according to the present invention is dependent upon the display window size of the first application in comparison to the second application. The apparatus and method of the present invention triggers a process according to the size of the display windows of the first and second applications.

In one aspect of the present invention, a method transitions between a first application having a video component and a second application. The method comprises receiving a selection of the second application by a user, de-activating the video component when the second application does not require the video component and synchronizing the video component and a graphics component of the first application and the second application when the second application does require the video component, wherein transitioning causes the first application to be removed from a first display frame and the second application to be displayed in a second display window. When the first display frame is a fullscreen, synchronizing further comprises turning off the graphics component, turning off a plurality of blend rectangles, bringing up the graphics component and restoring the video component. When the first display frame is the same size as the second display frame, synchronizing further comprises turning off the graphics component, turning off the plurality of blend rectangles, bringing up the graphics component and restoring the video component. When the first display frame is not a fullscreen and the second display frame is a fullscreen, synchronizing further comprises turning off the graphics component, turning off the plurality of blend rectangles, setting the second display frame to full, bringing up the graphics component and restoring the video component. When the first display frame is not a fullscreen, and the first display frame and the second display frame are not the same size, synchronizing further comprises filling the graphics component with black, turning off the video component, drawing a new graphics component and restoring the video component. The graphics component is chroma color. Synchronizing is not needed when the first application and the second application do not include the video component. The method further comprises displaying the first display frame and the second display frame on a display device, wherein the display device is a television.

In another aspect of the present invention, a playback device for transitioning between a first application having a video component and a second application comprises means for receiving a selection of the second application by a user, means for de-activating the video component when the second application does not require the video component and means for synchronizing the video component and a graphics component of the first application and the second application when the second application does require the video component, wherein transitioning causes the first application to be removed from a first display frame and the second application to be displayed in a second display window. When the first display frame is a fullscreen, the means for synchronizing further comprises means for turning off the graphics component, means for turning off a plurality of blend rectangles, means for bringing up the graphics component and means for restoring the video component. When the first display frame is the same size as the second display frame, the means for synchronizing further comprises means for turning off the graphics component, means for turning off a plurality of blend rectangles, means for bringing up the graphics component and means for restoring the video component. When the first display frame is not a fullscreen and the second display frame is a fullscreen, the means for synchronizing further comprises means for turning off the graphics component, means for turning off the plurality of blend rectangles, means for setting the second display frame to full, means for bringing up the graphics component and means for restoring the video component. When the first display frame is not a fullscreen, and the first display frame and the second display frame are not the same size, the means for synchronizing further comprises means for filling the graphics component with black, means for turning off the video component, means for drawing a new graphics component and means for restoring the video component. The graphics component is chroma color. The means for synchronizing is not needed when the first application and the second application do not include the video component. The playback device further comprises means for displaying the first display frame and the second display frame, wherein the means for displaying is a television.

In yet another aspect of the present invention, a playback device transitions between a first application having a video component and a second application, the playback device comprises an input/output interface configured to receive a selection of the second application by a user, a de-activating component configured to de-activate the video component when the second application does not require the video component and a synchronizing component configured to synchronize the video component and a graphics component of the first application and the second application when the second application does require the video component, wherein the transition causes the first application to be removed from a first display frame and the second application to be displayed in a second display window. When the first display frame is a fullscreen, the synchronizing component is further configured to turn off the graphics component, turn off a plurality of blend rectangles, bring up the graphics component and restore the video component. When the first display frame is the same size as the second display frame, the synchronizing component is further configured to turn off the graphics component, turn off a plurality of blend rectangles, bring up the graphics component and restore the video component. When the first display frame is not a fullscreen and the second display frame is a fullscreen, the synchronizing component is further configured to turn off the graphics component, turn off the plurality of blend rectangles, set the second display frame to full, bring up the graphics component and restore the video component. When the first display frame is not a fullscreen, and the first display frame and the second display frame are not the same size, the synchronizing component is further configured to fill the graphics component with black, turn off the video component, draw a new graphics component and restore the video component. The graphics component is chroma color. The means for synchronizing is not needed when the first application and the second application do not include the video component. The playback device further comprises means for displaying the first display frame and the second display frame, wherein the means for displaying is a television. The de-activating component and the synchronizing component are configured within a processor.

In yet another aspect of the present invention, a device comprises a processor and a system memory including a first application having a video component and a second application, wherein the first application is displayed in a first display frame, such that in operation when the second application is selected by a user, the processor transitions between the first application and the second application by de-activating the video component when the second application does not require the video component and synchronizing the video component and a graphics component of the first application and the second application when the second application does require the video component, wherein the transition causes the first application to be removed from the first display frame and the second application to be displayed in a second display window. When the first display frame is a fullscreen, the processor synchronizes by turning off the graphics component, turning off a plurality of blend rectangles, bringing up the graphics component and restoring the video component. When the first display frame is the same size as the second display frame, the processor synchronizes by turning off the graphics component, turning off a plurality of blend rectangles, bringing up the graphics component and restoring the video component. When the first display frame is not a fullscreen and the second display frame is a fullscreen, the processor synchronizes by turning off the graphics component, turning off the plurality of blend rectangles, setting the second display frame to full, bringing up the graphics component and restoring the video component. When the first display frame is not a fullscreen, and the first display frame and the second display frame are not the same size, the processor synchronizes by filling the graphics component with black, turning off the video component, drawing a new graphics component and restoring the video component. The graphics component is chroma color. The processor will not synchronize when the first application and the second application do not include the video component. The processor will display the first display frame and the second display frame on a display device, wherein the display device is a television.

In yet another aspect of the present invention, a set-top box comprises a processor and a system memory including a first application having a video component and a second application, wherein the first application is displayed in a first display frame, such that in operation when the second application is selected by a user, the processor transitions between the first application and the second application by de-activating the video component when the second application does not require the video component and synchronizing the video component and a graphics component of the first application and the second application when the second application does require the video component, wherein the transition causes the first application to be removed from the first display frame and the second application to be displayed in a second display window. When the first display frame is a fullscreen, the processor synchronizes by turning off the graphics component, turning off a plurality of blend rectangles, bringing up the graphics component and restoring the video component. When the first display frame is the same size as the second display frame, the processor synchronizes by turning off the graphics component, turning off a plurality of blend rectangles, bringing up the graphics component and restoring the video component. When the first display frame is not a fullscreen and the second display frame is a fullscreen, the processor synchronizes by turning off the graphics component, turning off the plurality of blend rectangles, setting the second display frame to full, bringing up the graphics component and restoring the video component. When the first display frame is not a fullscreen, and the first display frame and the second display frame are not the same size, the processor synchronizes by filling the graphics component with black, turning off the video component, drawing a new graphics component and restoring the video component. The graphics component is chroma color. The processor will not synchronize when the first application and the second application do not include the video component. The processor will display the first display frame and the second display frame on a display device, wherein the display device is a television.

DETAILED DESCRIPTION OF THE EMBODIMENTS

The present invention provides a method and apparatus for maintaining smooth video transition between distinct applications. Preferably, the device implementing the present invention includes a processor, a secondary memory and a system memory. The system memory preferably includes random access memory (RAM) onto which a plurality of applications are loaded from the secondary memory. Applications are set to either an active state or an inactive state. In the active state, the processor actively processes the application and a portion of the system memory is used by the processor for active processing. In the inactive state, neither the processor nor the portion of the system memory dedicated for active processing are used by the application. Preferably, only one application is in the active state at any given time. When multiple applications are currently stored in RAM, one of the applications is set to the active state while the other applications are set to the inactive state. When one of the inactive state applications is selected for use, the currently active state application is de-activated so that all applications stored in RAM are set to the inactive state. Then, the selected application is set to the active state. In this manner, only one application is set to the active state at any given time, even when switching from one application to another.

An apparatus and method of the present invention is implemented to provide smooth transition between a first application in the active state and a second application approaching the active state. The central processing unit (CPU) first determines whether the first and second applications have video components. If both applications do not have a video component, then no synchronization is needed. If the CPU detects that a video component is present in the first application, but not required in the second application, then the CPU will turn off the video component in order to provide synchronization between the applications. If the CPU detects that the first application includes a video component and the second application requires a video component, then the CPU will synchronize the video and graphics components according to the graphics state of each application.

Figure 1:
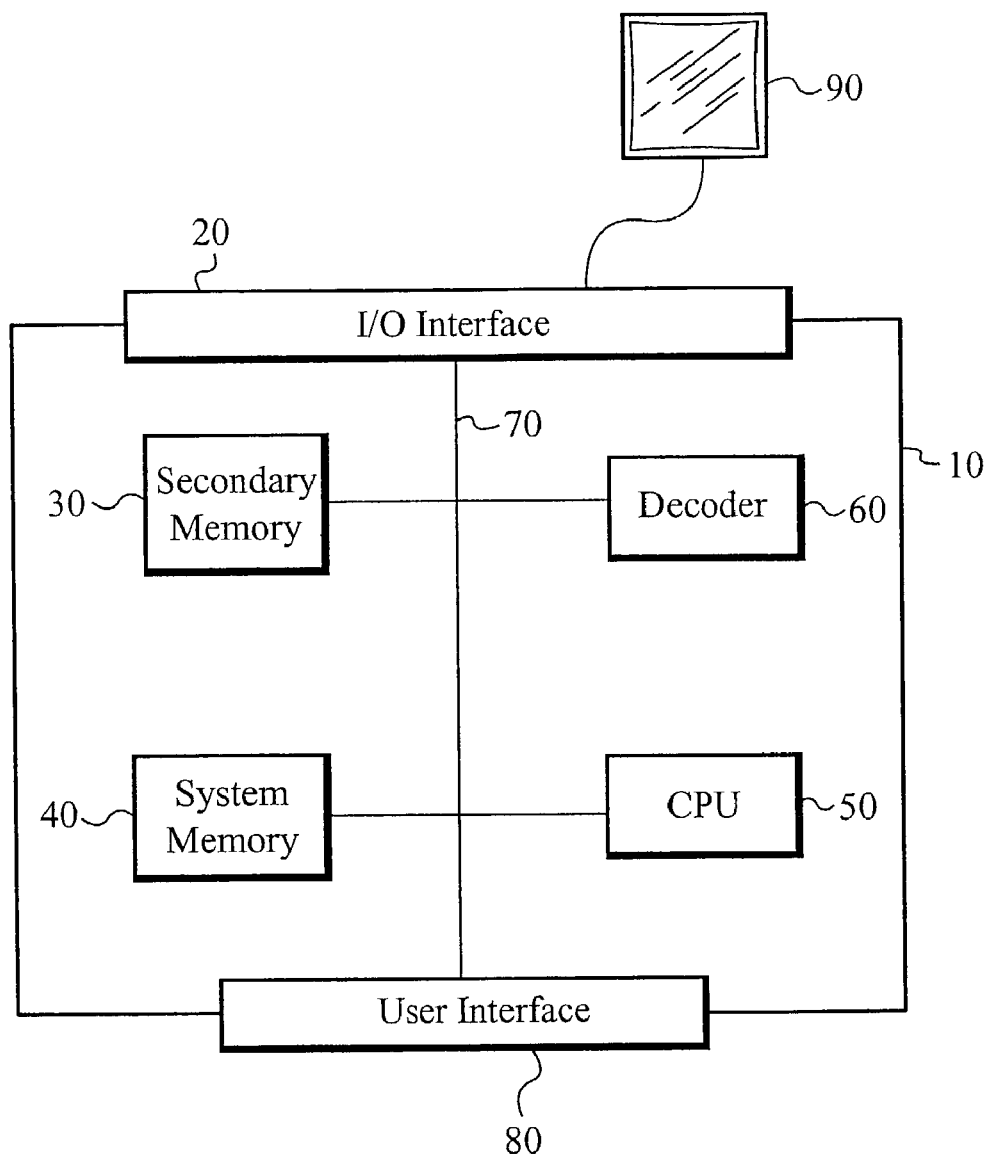
FIG. 1 illustrates an exemplary set-top box according to the present invention.

FIG. 1 illustrates an exemplary set-top box according to the present invention. The set-top box preferably controls the transmission of multimedia from a local storage device, such as a personal computer (PC), to a television 90 or from a remote content provider, such as a cable television provider, to the television 90. The set-top box 10 includes an input/output (I/O) interface 20, a secondary memory 30, a system memory 40, a central processing unit (CPU) 50, a user interface 80, and a decoder 60 all coupled via a bi-directional bus 70. The I/O interface 20 preferably couples the set-top box 10 to a content source (not shown) for receiving multimedia and to the television 90 or other display device for displaying the multimedia received from the content source. The I/O interface 20 can also be coupled to a conventional network, such as the Internet, to receive periodic software upgrades including new versions of operating software and new or upgraded applications. The I/O interface 20 also sends and receives control signals to and from the user interface 80 and the television 90. The user interface 80 preferably comprises a keypad and display, as is well known in the art. Alternatively, the user interface 80 comprises any conventional user interface.

The secondary memory 30 stores the software used to enable operation of the set-top box 10 along with a plurality of applications. Exemplary applications include, but are not limited to a menu of available content such as an on-screen television guide, and display parameter settings such as color, tint, and brightness. Preferably, the secondary memory 30 is flash memory. Alternatively, any conventional type of memory can be used. Preferably, the system memory 40 includes random access memory (RAM). The system memory 40 can also include additional buffers, registers, and cache according to specific design implementations. Multimedia received by the set-top box 10 is preferably encrypted to prevent unauthorized access and use, and the decoder 60 decrypts the multimedia according to access authorization provided by the CPU 50.

Figure 3A:
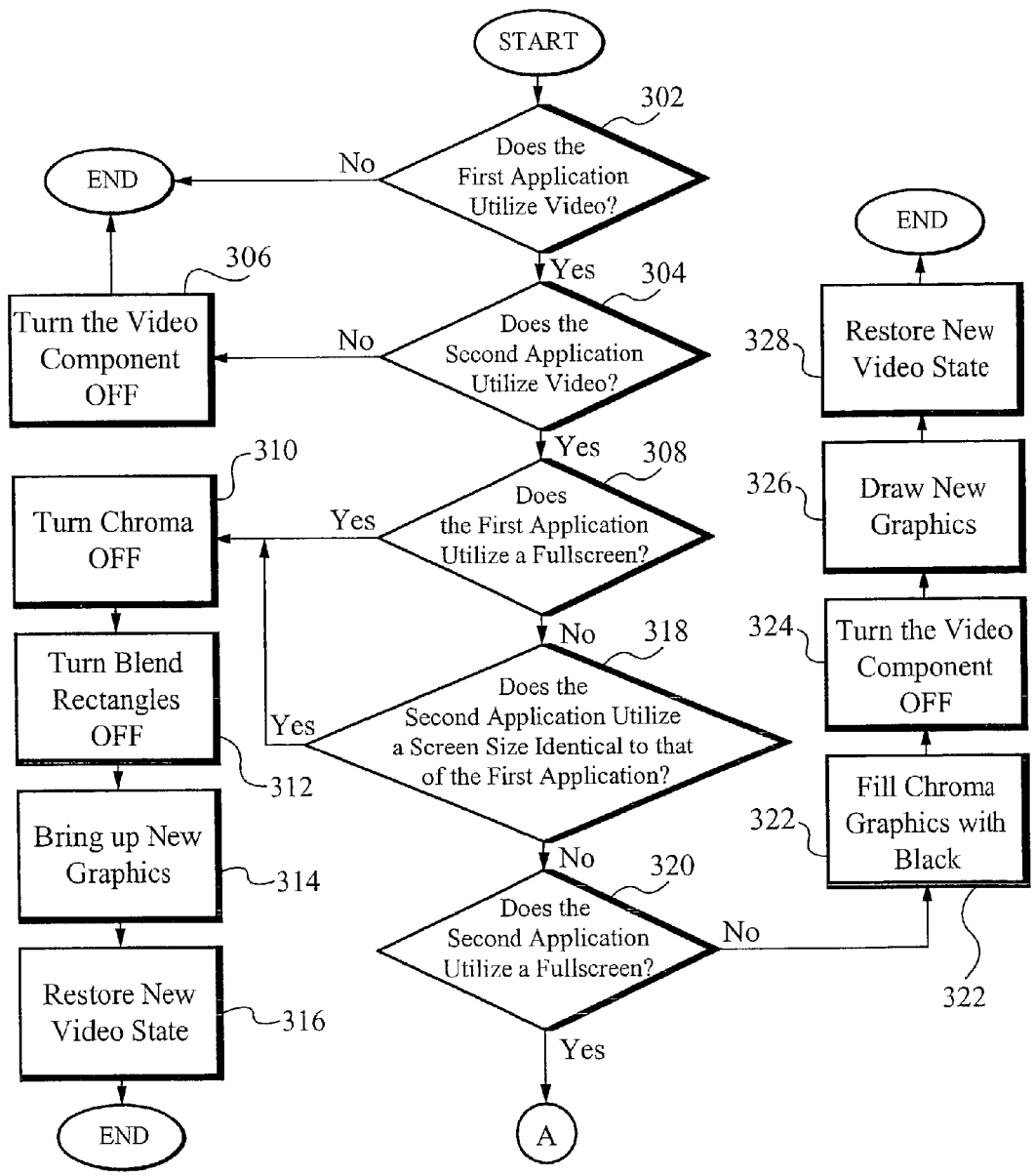
FIG. 3 illustrates a preferred method of the present invention.
Figure 3B:
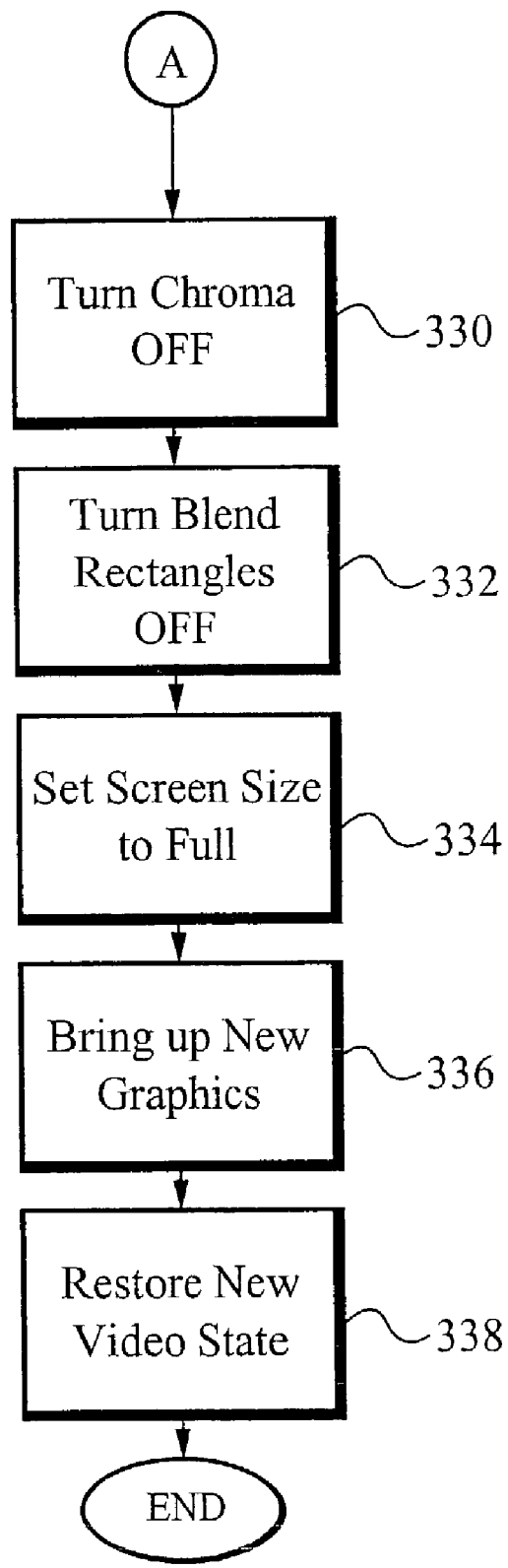

FIGS. 3a and 3b illustrate a method of the preferred embodiment of the present invention. In this preferred embodiment, a first application is the application that is currently open and the second application is being transmitted to by the user. In step 302, it is determined whether the first application utilizes a video component. If the first application does not include a video component, then the method ends. If the first application does include a video component, then in step 304 it is determined whether the second application utilizes a video component. If the second application does not utilize a video component, then the video component of the first application is turned off in step 306 before the method ends. If the second application utilizes a video component, then the method moves on to step 308, where it is determined whether the first application utilizes a fullscreen display window. If the first application does not utilize a fullscreen display window then the method determines in step 318 whether the second application utilizes a display window screen size identical to that of the first application. If in step 318, the second application does utilize a display window screen size identical to that of the first application, or if in step 308 the first application utilizes a fullscreen display window, then the method will advance to step 310.

Still referring to FIGS. 3a and 3b, in step 310 the graphics chroma component of the first application is turned off before the blend rectangles are turned off in step 312. The method continues the smooth transition between the first application and the second application in step 314, where the new graphics of the second application are brought up and displayed. Finally, in step 316 the new video state of the second application is restored before the method ends. If it is determined at the step 318, that the second application does not utilize a display window screen size identical to that of the first application, then the method proceeds to step 320.

In step 320, if the second application does not utilize a fullscreen display window, then the method proceeds to step 322. In step 322, the chroma graphics of the first application are filled with black. Then, in step 324 the video component of the first application is turned off. In step 326, the new graphics of the second application are drawn, and in step 328, the new video state of the second application is restored before the method ends.

If it is determined at the step 320 in FIG. 3a, that the second application does utilize a fullscreen display window, then the method proceeds to step 330 in FIG. 3b. In step 330, the chroma graphics of the first application are turned off. After the chroma is turned off, the blend rectangles are turned off in step 332. The display window screen size is then set to a fullscreen display window in step 334. After the display window screen size is set to fullscreen, the new graphics of the second application are brought up in step 336. The new video state of the second application is then restored in step 338 before the method ends.

Figure 2:
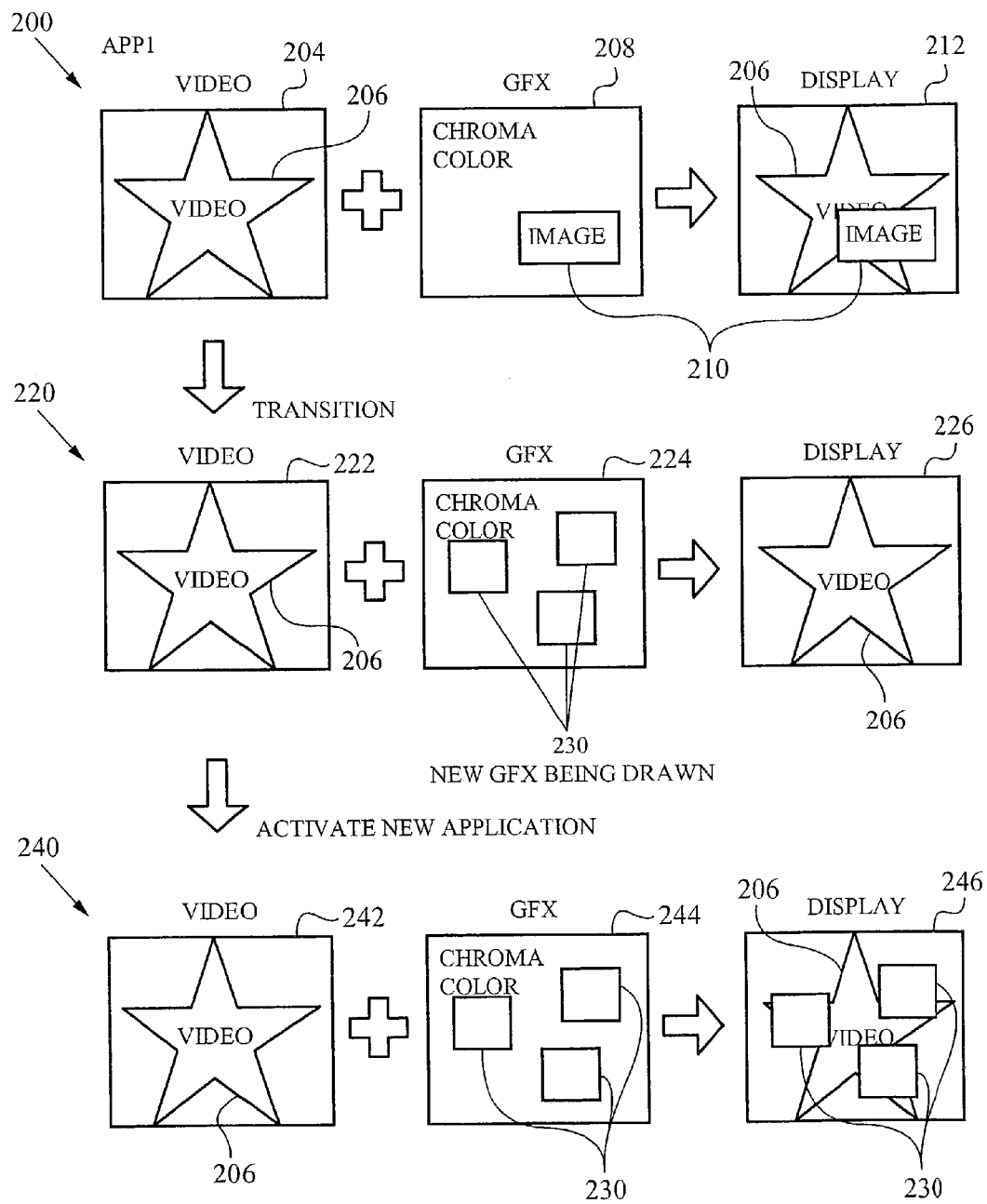
FIG. 2 illustrates a process of the present invention to synchronize the graphics and video between applications.

FIG. 2 illustrates an exemplary process of the present invention to provide a smooth transition between a first application and a second application by synchronizing the video component and the graphics component. A first application 200 includes both a video frame 204 and a graphics frame 208 that are overlaid to produce the display frame 212. The display frame 212 produced by this first application contains both a video image 206 and a graphics image 210. In the transition state 220, the video frame 222 again includes the video image 206. Here, the graphics image 210 of the first application 200 is turned off in the transition stage 220, while the new graphics images 230 for the second application 240 are being drawn in the graphics frame 224. The graphics image 210 of the first application 200 is turned off by turning off the chroma color in the graphics frame 208 and keeping the chroma color off in the graphics frame 224 through the transition 220. Turning the chroma color off "hides" the graphics image 210 by not displaying it on the screen while the graphics images 230 of the second application 240 are being drawn. Therefore, the display frame 226 in the transition stage 220 includes only the video image 206.

Still referring to FIG. 2, after the transition stage 220, the second application 240 is activated and the video image 206 is restored in the video frame 242 of the second application 240. The graphics image(s) 230 are now brought up in the graphics frame 244 of the second application 240. The resulting display frame 246 includes the restored video image 206 and new graphics image(s) 230. Thus, a smooth transition from the first application 200 to the second application 240 is achieved.

In operation, a system memory includes a plurality of applications previously loaded from a secondary memory. One of the applications is set to an active state while the remaining applications are set to an inactive state. When one of the applications in the inactive state is selected for use, the application set to the active state (the first application) must be returned to the inactive state, while the application selected for use (the second application) is made active. This operation includes taking down the graphics and video components of the first application while bringing up the video and graphics of the second application, which can cause artifacts to appear on the display screen if the mixed video and graphics components of the two applications are not synchronized. When the second application is selected, the apparatus and method of the present invention first determines the video state of both applications. If neither application contains a video component, then no synchronization is necessary. If only the first application includes a video component, then the CPU simply turns off the video component in order to provide a synchronized transition. In the case that both the first and second applications include video components, then the CPU will execute the appropriate method as described above, thereby providing a smooth transition between applications through synchronization of the video and graphics component.

In conclusion, the method and apparatus of the present invention provides smooth transition between two applications. Without the synchronization of the video and graphics components of the two applications, artifacts oftentimes appear on the display screen during transition from the first application to the second application. The method and apparatus of the present invention eliminates such artifacts by performing a method based on the video and graphics states of the first and second application.

The present invention has been described in terms of specific embodiments incorporating details to facilitate the understanding of the principles of construction and operation of the invention. Such references, herein, to specific embodiments and details thereof are not intended to limit the scope of the claims appended hereto. It will be apparent to those skilled in the art that modifications can be made in the embodiments chosen for illustration without departing from the spirit and scope of the invention. Specifically, it will be apparent to one of ordinary skill in the art that while the preferred embodiment of the present invention is used with set-top boxes, the present invention can also be implemented on any other appropriate system resource limited device.

What is claimed is:

1. A method of transitioning between a first application having a video component and a second application, the method comprising:
   a. receiving a selection of the second application by a user;
   b. de-activating the video component when the second application does not require the video component; and
   c. synchronizing the video component and a graphics component of the first application and the second application when the second application does require the video component,
   wherein transitioning causes the first application to be removed from a first display frame and the second application to be displayed in a second display window.

2. The method according to claim 1 wherein when the first display frame is a fullscreen, synchronizing further comprises:
   a. turning off the graphics component;
   b. turning off a plurality of blend rectangles;
   c. bringing up the graphics component; and
   d. restoring the video component.

3. The method according to claim 1 wherein when the first display frame is the same size as the second display frame, synchronizing further comprises:
   a. turning off the graphics component;
   b. turning off the plurality of blend rectangles;
   c. bringing up the graphics component; and
   d. restoring the video component.

4. The method according to claim 1 wherein when the first display frame is not a fullscreen and the second display frame is a fullscreen, synchronizing further comprises:
   a. turning off the graphics component;
   b. turning off the plurality of blend rectangles;
   c. setting the second display frame to full;
   c. bringing up the graphics component; and
   d. restoring the video component.

5. The method according to claim 1 wherein when the first display frame is not a fullscreen, and the first display frame and the second display frame are not the same size, synchronizing further comprises:
   a. filling the graphics component with black;
   b. turning off the video component;
   c. drawing a new graphics component; and
   d. restoring the video component.

6. The method according to claim 1 wherein the graphics component is chroma color.

7. The method according to claim 1 wherein synchronizing is not needed when the first application and the second application do not include the video component.

8. The method according to claim 1 further comprising displaying the first display frame and the second display frame on a display device.

9. The method according to claim 8 wherein the display device is a television.

10. A playback device for transitioning between a first application having a video component and a second application, the playback device comprising:
   a. means for receiving a selection of the second application by a user;
   b. means for de-activating the video component when the second application does not require the video component; and
   c. means for synchronizing the video component and a graphics component of the first application and the second application when the second application does require the video component,
   wherein transitioning causes the first application to be removed from a first display frame and the second application to be displayed in a second display window.

11. The playback device according to claim 10 wherein when the first display frame is a fullscreen, the means for synchronizing further comprises:
   a. means for turning off the graphics component;
   b. means for turning off a plurality of blend rectangles;
   c. means for bringing up the graphics component; and
   d. means for restoring the video component.

12. The playback device according to claim 10 wherein when the first display frame is the same size as the second display frame, the means for synchronizing further comprises:
   a. means for turning off the graphics component;
   b. means for turning off a plurality of blend rectangles;
   c. means for bringing up the graphics component; and
   d. means for restoring the video component.

13. The playback device according to claim 10 wherein when the first display frame is not a fullscreen and the second display frame is a fullscreen, the means for synchronizing further comprises:
   a. means for turning off the graphics component;
   b. means for turning off the plurality of blend rectangles;
   c. means for setting the second display frame to full;
   c. means for bringing up the graphics component; and
   d. means for restoring the video component.

14. The playback device according to claim 10 wherein when the first display frame is not a fullscreen, and the first display frame and the second display frame are not the same size, the means for synchronizing further comprises:
   a. means for filling the graphics component with black;
   b. means for turning off the video component;
   c. means for drawing a new graphics component; and
   d. means for restoring the video component.

15. The playback device according to claim 10 wherein the graphics component is chroma color.

16. The playback device according to claim 10 wherein the means for synchronizing is not needed when the first application and the second application do not include the video component.

17. The playback device according to claim 10 further comprising means for displaying the first display frame and the second display frame.

18. The playback device according to claim 17 wherein the means for displaying is a television.

19. A playback device to transition between a first application having a video component and a second application, the playback device comprising:
   a. an input/output interface configured to receive a selection of the second application by a user;
   b. a de-activating component configured to de-activate the video component when the second application does not require the video component; and
   c. a synchronizing component configured to synchronize the video component and a graphics component of the first application and the second application when the second application does require the video component,
   wherein the transition causes the first application to be removed from a first display frame and the second application to be displayed in a second display window.

20. The playback device according to claim 19 wherein when the first display frame is a fullscreen, the synchronizing component is further configured to turn off the graphics component, turn off a plurality of blend rectangles, bring up the graphics component and restore the video component.

21. The playback device according to claim 19 wherein when the first display frame is the same size as the second display frame, the synchronizing component is further configured to turn off the graphics component, turn off a plurality of blend rectangles, bring up the graphics component and restore the video component.

22. The playback device according to claim 19 wherein when the first display frame is not a fullscreen and the second display frame is a fullscreen, the synchronizing component is further configured to turn off the graphics component, turn off the plurality of blend rectangles, set the second display frame to full, bring up the graphics component and restore the video component.

23. The playback device according to claim 19 wherein when the first display frame is not a fullscreen, and the first display frame and the second display frame are not the same size, the synchronizing component is further configured to fill the graphics component with black, turn off the video component, draw a new graphics component and restore the video component.

24. The playback device according to claim 19 wherein the graphics component is chroma color.

25. The playback device according to claim 19 wherein the means for synchronizing is not needed when the first application and the second application do not include the video component.

26. The playback device according to claim 19 further comprising means for displaying the first display frame and the second display frame.

27. The playback device according to claim 26 wherein the means for displaying is a television.

28. The playback device according to claim 19 wherein the de-activating component and the synchronizing component are configured within a processor.

29. A device comprising:
   a. a processor; and
   b. a system memory including a first application having a video component and a second application, wherein the first application is displayed in a first display frame, such that in operation when the second application is selected by a user, the processor transitions between the first application and the second application by de-activating the video component when the second application does not require the video component and synchronizing the video component and a graphics component of the first application and the second application when the second application does require the video component, wherein the transition causes the first application to be removed from the first display frame and the second application to be displayed in a second display window.

30. The device according to claim 29 wherein when the first display frame is a fullscreen, the processor synchronizes by turning off the graphics component, turning off a plurality of blend rectangles, bringing up the graphics component and restoring the video component.

31. The device according to claim 29 wherein when the first display frame is the same size as the second display frame, the processor synchronizes by turning off the graphics component, turning off a plurality of blend rectangles, bringing up the graphics component and restoring the video component.

32. The device according to claim 29 wherein when the first display frame is not a fullscreen and the second display frame is a fullscreen, the processor synchronizes by turning off the graphics component, turning off the plurality of blend rectangles, setting the second display frame to full, bringing up the graphics component and restoring the video component.

33. The device according to claim 29 wherein when the first display frame is not a fullscreen, and the first display frame and the second display frame are not the same size, the processor synchronizes by filling the graphics component with black, turning off the video component, drawing a new graphics component and restoring the video component.

34. The device according to claim 29 wherein the graphics component is chroma color.

35. The device according to claim 29 wherein the processor will not synchronize when the first application and the second application do not include the video component.

36. The device according to claim 29 wherein the processor will display the first display frame and the second display frame on a display device.

37. The device according to claim 36 wherein the display device is a television.

38. A set-top box comprising:
a. a processor; and
b. a system memory including a first application having a video component and a second application, wherein the first application is displayed in a first display frame, such that in operation when the second application is selected by a user, the processor transitions between the first application and the second application by de-activating the video component when the second application does not require the video component and synchronizing the video component and a graphics component of the first application and the second application when the second application does require the video component, wherein the transition causes the first application to be removed from the first display frame and the second application to be displayed in a second display window.

39. The set-top box according to claim 38 wherein when the first display frame is a fullscreen, the processor synchronizes by turning off the graphics component, turning off a plurality of blend rectangles, bringing up the graphics component and restoring the video component.

40. The set-top box according to claim 38 wherein when the first display frame is the same size as the second display frame, the processor synchronizes by turning off the graphics component, turning off a plurality of blend rectangles, bringing up the graphics component and restoring the video component.

41. The set-top box according to claim 38 wherein when the first display frame is not a fullscreen and the second display frame is a fullscreen, the processor synchronizes by turning off the graphics component, turning off the plurality of blend rectangles, setting the second display frame to full, bringing up the graphics component and restoring the video component.

42. The set-top box according to claim 38 wherein when the first display frame is not a fullscreen, and the first display frame and the second display frame are not the same size, the processor synchronizes by filling the graphics component with black, turning off the video component, drawing a new graphics component and restoring the video component.

43. The set-top box according to claim 38 wherein the graphics component is chroma color.

44. The set-top box according to claim 38 wherein the processor will not synchronize when the first application and the second application do not include the video component.

45. The set-top box according to claim 38 wherein the processor will display the first display frame and the second display frame on a display device.

46. The set-top box according to claim 45 wherein the display device is a television.

* * * * *